United States Patent
Chappati et al.

(10) Patent No.: US 12,438,871 B1
(45) Date of Patent: Oct. 7, 2025

(54) METHODS AND SYSTEMS FOR CENTRALIZED AUTHORIZATION/AUTHENTICATION FOR MICROSERVICES

(71) Applicant: NETAPP, INC., San Jose, CA (US)

(72) Inventors: Balaji Swaroop Chappati, Bangalore (IN); Jayanta Poddar, Bangalore (IN)

(73) Assignee: NETAPP, INC., San Jose, CA (US)

( * ) Notice: Subject to any disclaimer, the term of this patent is extended or adjusted under 35 U.S.C. 154(b) by 13 days.

(21) Appl. No.: 18/627,874

(22) Filed: Apr. 5, 2024

(51) Int. Cl.
*G06F 15/16* (2006.01)
*H04L 9/40* (2022.01)
*H04L 67/1097* (2022.01)

(52) U.S. Cl.
CPC .......... *H04L 63/083* (2013.01); *H04L 63/102* (2013.01); *H04L 67/1097* (2013.01)

(58) Field of Classification Search
CPC .. H04L 63/083; H04L 63/102; H04L 67/1097
USPC ........................................................ 709/225
See application file for complete search history.

(56) References Cited

U.S. PATENT DOCUMENTS

| | | | | |
|---|---|---|---|---|
| 10,200,358 B2* | 2/2019 | Lander | | H04L 63/083 |
| 10,516,672 B2* | 12/2019 | Gupta | | H04L 63/102 |
| 10,574,644 B2* | 2/2020 | Ananthapur Bache | | H04L 63/0815 |
| 10,623,406 B2* | 4/2020 | Maker | | H04L 63/083 |
| 10,992,780 B1* | 4/2021 | Rudrappa Goniwada | | H04L 67/34 |
| 11,093,232 B2* | 8/2021 | Maréchal | | G06F 8/65 |
| 11,381,552 B2* | 7/2022 | Yan | | H04L 63/0846 |
| 11,388,164 B2* | 7/2022 | Joyce | | H04L 63/0209 |
| 11,902,271 B2* | 2/2024 | Sharma | | H04L 9/3213 |
| 12,107,860 B2* | 10/2024 | Calegari | | H04L 63/0281 |
| 12,323,409 B2* | 6/2025 | Hulick, Jr. | | H04L 9/3263 |
| 2017/0331812 A1* | 11/2017 | Lander | | H04L 63/0815 |
| 2018/0026984 A1* | 1/2018 | Maker | | H04L 63/102 726/4 |
| 2018/0041515 A1* | 2/2018 | Gupta | | G06F 21/53 |
| 2018/0324173 A1* | 11/2018 | Ananthapur Bache | | H04L 63/0815 |
| 2020/0348921 A1* | 11/2020 | Maréchal | | G06F 11/3688 |
| 2021/0029110 A1* | 1/2021 | Yan | | H04L 63/0823 |
| 2021/0037018 A1* | 2/2021 | Joyce | | H04L 63/0209 |
| 2022/0021711 A1* | 1/2022 | Marsh | | H04L 9/3247 |
| 2022/0329584 A1* | 10/2022 | Sharma | | H04L 9/3263 |
| 2023/0171240 A1* | 6/2023 | Hulick, Jr. | | H04L 9/3263 726/6 |

(Continued)

*Primary Examiner* — Moustafa M Meky
(74) *Attorney, Agent, or Firm* — LOZA & LOZA, LLP

(57) ABSTRACT

Methods and systems use a central validation module of a microservice-based system to interface an external identity provider (IDP) among a plurality of external IDPs to receive authentication and/or authorization information for an external request from a client. After the authentication and/or authorization information has been received for the external request, an internal request containing the authentication and/or authorization information is generated by the central validation module, which is transmitted to at least one microservice of the microservice-based system to provide services in response to the external request. The internal request is validated with the central validation module by each of the at least one microservice, which executes at least one operation to provide the services. A response that is based at least partly on results of the services provided by the at least one microservice is returned for the external request to the client.

20 Claims, 10 Drawing Sheets

(56) References Cited

U.S. PATENT DOCUMENTS

2024/0004973 A1* 1/2024 Bosch ................ G06F 21/31
2024/0356910 A1* 10/2024 Kim ................ H04L 63/083

* cited by examiner

METHODS AND SYSTEMS FOR CENTRALIZED AUTHORIZATION/AUTHENTICATION FOR MICROSERVICES

TECHNICAL FIELD

The present disclosure relates to microservice-based systems, and more particularly to executing authorization/authentication for microservices in a microservice-based systems.

BACKGROUND

For various applications, a microservice architecture may be preferred over a standalone monolithic architecture. The use of microservices enables different operations to be executed by small independent services based on specific needs. Due to their modular design, microservices allow applications to be developed quickly and easily scaled.

However, microservice architecture does come with some challenges. One of these challenges is with respect to authentication and/or authorization. For maximum security, each microservice should execute authentication and/or authorization to ensure that a requesting entity has the proper credentials and authority to make a request for that microservice. However, such a solution requires significant overhead with respect to the size of the microservices since each microservice must be coded to execute individual authentication and/or authorization. Another solution would be to use a single module that initially performs the authentication and/or authorization when a request is received from a requesting entity. However, this solution is vulnerable to security breach since the microservices must assume that any request has already been properly authenticated and/or authorized.

SUMMARY

Methods and systems use a central validation module of a microservice-based system to interface an external identity provider (IDP) among a plurality of external IDPs to receive authentication and/or authorization information for an external request from a client. After the authentication and/or authorization information has been received for the external request, an internal request containing the authentication and/or authorization information is generated by the central validation module, which is transmitted to at least one microservice of the microservice-based system to provide services in response to the external request. The internal request is validated with the central validation module by each of the at least one microservice, which executes at least one operation to provide the services. A response that is based at least partly on results of the services provided by the at least one microservice is returned for the external request to the client.

A method executed by one or more processors in accordance with an embodiment of the invention comprises receiving an external request from a client at a microservice-based system, transmitting the external request within the microservice-based system to a central validation module, based on information associated with the external request, interfacing an external identity provider (IDP) among a plurality of external IDPs by the central validation module to receive authentication and/or authorization information for the external request, after the authentication and/or authorization information has been received for the external request, generating an internal request containing the authentication and/or authorization information by the central validation module, transmitting the internal request to at least one microservice of the microservice-based system to provide services in response to the external request, validating the internal request with the central validation module by each of the at least one microservice, executing at least one operation by each of the at least one microservice to provide the services, and returning a response for the external request to the client, wherein the response is at least partly based on results of the services provided by the at least one microservice. In some embodiments, the steps of this method are performed when program instructions contained in a non-transitory computer-readable storage medium are executed by one or more processors.

A system in accordance with an embodiment of the invention comprises memory and at least one processor configured to receive an external request from a client at a microservice-based system, transmit the external request within the microservice-based system to a central validation module, based on information associated with the external request, interface an external identity provider (IDP) among a plurality of external IDPs by the central validation module to receive authentication and/or authorization information for the external request, after the authentication and/or authorization information has been received for the external request, generate an internal request containing the authentication and/or authorization information by the central validation module, transmit the internal request to at least one microservice of the microservice-based system to provide services in response to the external request, validate the internal request with the central validation module by each of the at least one microservice, execute at least one operation by each of the at least one microservice to provide the services, and return a response for the external request to the client, wherein the response is at least partly based on results of the services provided by the at least one microservice.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

The foregoing features and other features will now be described with reference to the drawings of the various aspects and embodiments of the present disclosure. In the drawings, the same components have the same reference numerals, and similar reference numbers may be used to identify similar elements. The illustrated embodiments and aspects are intended to illustrate, but not to limit the present disclosure. The drawings include the following figures.

DETAILED DESCRIPTION

In one aspect, innovative computing technology is disclosed to use a centralized service for authentication and/or authorization for microservices in a microservice-based system, which may require getting authentication and/or authorization from one or more external identity providers (IDPs). As described in detail below, the centralized service interfaces with the external IDPs when needed and generates tokens, which can be used by the microservices with the centralized service for authentication and/or authorization. Thus, the individual microservices do not need to reach out to any external IDPs for authentication and/or authorization. Details regarding the innovative technology are provided below.

As preliminary note, the terms "component", "module", "system," and the like as used herein are intended to refer to a computer-related entity, either software-executing general-purpose processor, hardware, firmware and a combination thereof. For example, a component may be, but is not limited to being, a process running on a processor, a hardware-based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), solid state drive, hard disk, EEPROM (electrically erasable programmable read only memory), non-volatile memory or any other storage device, in accordance with the claimed subject matter.

Figure 1:
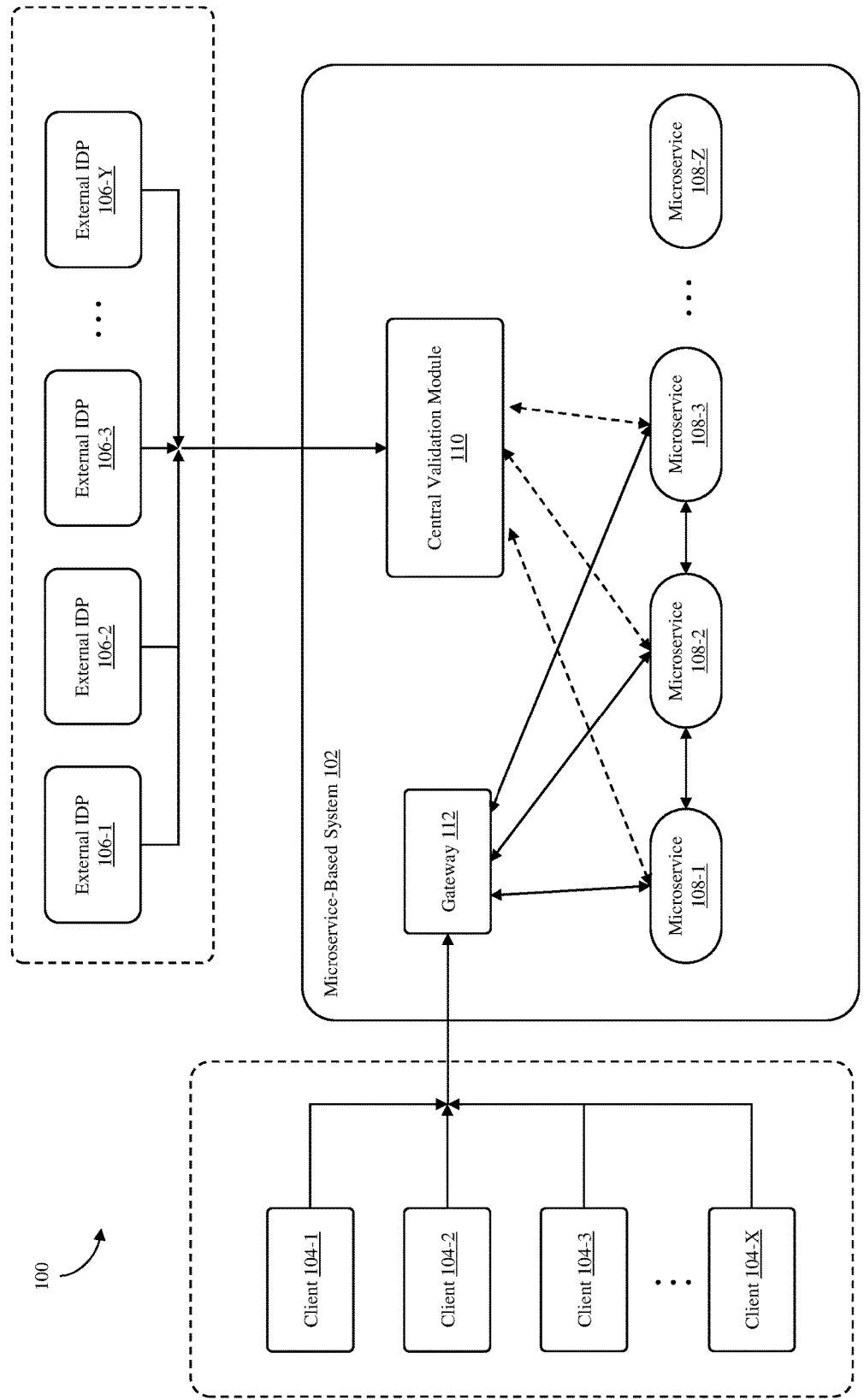
FIG. 1 shows a computing environment with a microservice-based system in accordance with an embodiment of the invention.

Turning now to FIG. 1, a computing environment 100 with a microservice-based system 102 in accordance with an embodiment of the invention is illustrated. In the illustrated embodiment, the computing environment 100 includes a number of clients 104-1, 104-2, 104-3 . . . 104-X (sometimes identified simply as "104"), a number of external identity providers (IDPs) 106-1, 106-2, 106-3 . . . 106-Y (sometimes identified simply as "106") and the microservice-based system 102. As described in detail below, the microservice-based system 102 uses an internal centralized service to authenticate and/or authorize any of the clients that request services from the microservice-based system, which may involve the internal centralized service to validate the requesting clients with at least one of the external IDPs 106 that are onboarded or registered with the microservice-based system.

Each of the clients 104 may be any type of computing entities that require or want services to be executed by the microservice-based system 102. These clients 104 may be software entities, such as software processes, software applications and user interfaces (UIs), or physical entities, such as electronic devices and computer systems. The exact types of clients included in the computing environment 100 will depend on the microservice-based system 102 and the services offered by the microservice-based system.

Some of these clients 104 may require external authentication and/or authorization from at least one of the external IDPs 106 in order for the microservice-based system 102 to execute the requested services, which may involve executing one or more operations. Other clients 104 may only require internal authentication and/or authorization from the microservice-based system 102 itself, i.e., without involvement from any of the external IDPs 106. Still other clients 104 may require both external and internal authentication and/or authorization from at least one of the external IDPs 106 and the microservice-based system 102.

The microservice-based system 102 includes a number of microservices 108-1, 108-2, 108-3 . . . 108-Z (sometimes identified simply as "108"), which may be invoked in response to requests from the clients 104. Depending on the request, one or more of the microservices may be called to fulfil the request. For certain client requests, some of the microservices for the requests may be invoked in a sequential order so that the relevant operations of the microservices may be sequentially executed. For other client requests, some of the microservices for the requests may be invoked in parallel so that the relevant operations of the microservices are executed in parallel. Still for other client requests, some of the microservices for the requests may be invoked in a sequential order and other microservices for the same requests may be invoked in parallel.

Unlike the microservices in some conventional microservice-based systems, the microservices 108 of the microservice-based system 102 are not configured or coded to interface with external IDPs, such as the external IDPs 106, for authentication and/or authorization with respect to incoming requests from the clients 104. In contrast, the microservice-based system 102 includes a central validation module 110, which provides authentication and/or authorization services for all the microservices 108 in the microservice-based system 102, regardless of whether or not accessing the external IDPs 106 for authentication and/or authorization is needed. Depending on the requests, the authentication and/or authorization services executed by the central validation module may involve one or more internal authentication and/or authorization operations, i.e., operations that do not involve any external IDPs, one or more external authentication and/or authorization operations, i.e., operations that do involve external IDPs, or a combination of internal and external authentication and/or authorization operations.

In an embodiment, for each external request received at the microservice-based system 102 from one of the clients 104, an internal request is created by the central validation module 110 after the external request has been validated with respect to authentication and/or authorization. The internal request may include information from the external request, as well as authentication and authorization information. As described below, the internal requests are used by each of the microservices for authentication and/or authorization of the requests. The external requests may include, but not limited to, credential information, such as Security Assertion markup language (SAML), Open Authorization 2 (OAuth2) or certificate, and application identification (ID).

In some embodiments, the external requests from the clients 104 and the internal requests generated by the central validation module 110 may be in the form of tokens, e.g., JavaScript Object Notation (JSON) Web Tokens or JWTs. Thus, in these embodiments, the central validation module 110 receives an external token from a client and then generates a new internal token with authentication and/or authorization information, after the requesting client has been authenticated and/or authorized using the received external token, which may involve one or more external IDPs 106.

An example of an external token in the form of Auth0 token is as follows:
{
"iss": https://YOUR_DOMAIN/,
"sub": "auth0|USER_ID",
"aud": [
"YOUR_API_IDENTIFIER",
https://YOUR_DOMAIN/userinfo
],
"iat": 1516239022,
"exp": 1516242622,
"azp": "YOUR_CLIENT_ID",
"scope": "openid profile"
}

In the above example, the different elements of the token have the following definitions:
iss (Issuer)—The issuer of the JWT. This is the URL of an Auth0 tenant.
sub (Subject)—The subject of the JWT. This is the user ID of the user in the Auth0 tenant.
aud (Audience)—The audience of the JWT. This is the identifier of the API that the JWT is intended for.
iat (Issued At)—The time the JWT was issued. This is a Unix epoch timestamp.
exp (Expiration Time)—The time the JWT expires. This is a Unix epoch timestamp.
azp (Authorized Party)—The party to which the JWT was issued. This is the Auth0 client ID.
scope—The scopes that were granted to the user.

An example of an internal token may include (a) privileges for Role-Based Access Control (RBAC) check, (b) tenant id to maintain multi-tenancy, (c) session id, and (d) Security Assertion Markup Language (SAML) token, depending on the authentication mechanism with the external IDP.

In the illustrated embodiment, the microservice-based system 102 includes a gateway 112, which interfaces with the clients 104 to receive requests from the clients and to transmit or return appropriate responses for the requests. As described in more detail below, the gateway 112 may also communicate with the microservices 108 and the central validation module 110 in order to pass the external or internal requests, which may be in the form of tokens, to the appropriate components of the microservice-based system 102.

The microservice-based system 102 can be any system that provides services to a requesting client, which may involve communicating with one or more external IDPs. As an example, the microservice-based system 102 may be a storage interface appliance that operates as an interface between one or more virtualization environments and a storage system to provide logical storage unit datastores, such as virtual volume (vVol) datastores, to the virtualization environments using the physical resources of the storage system.

Figure 2:
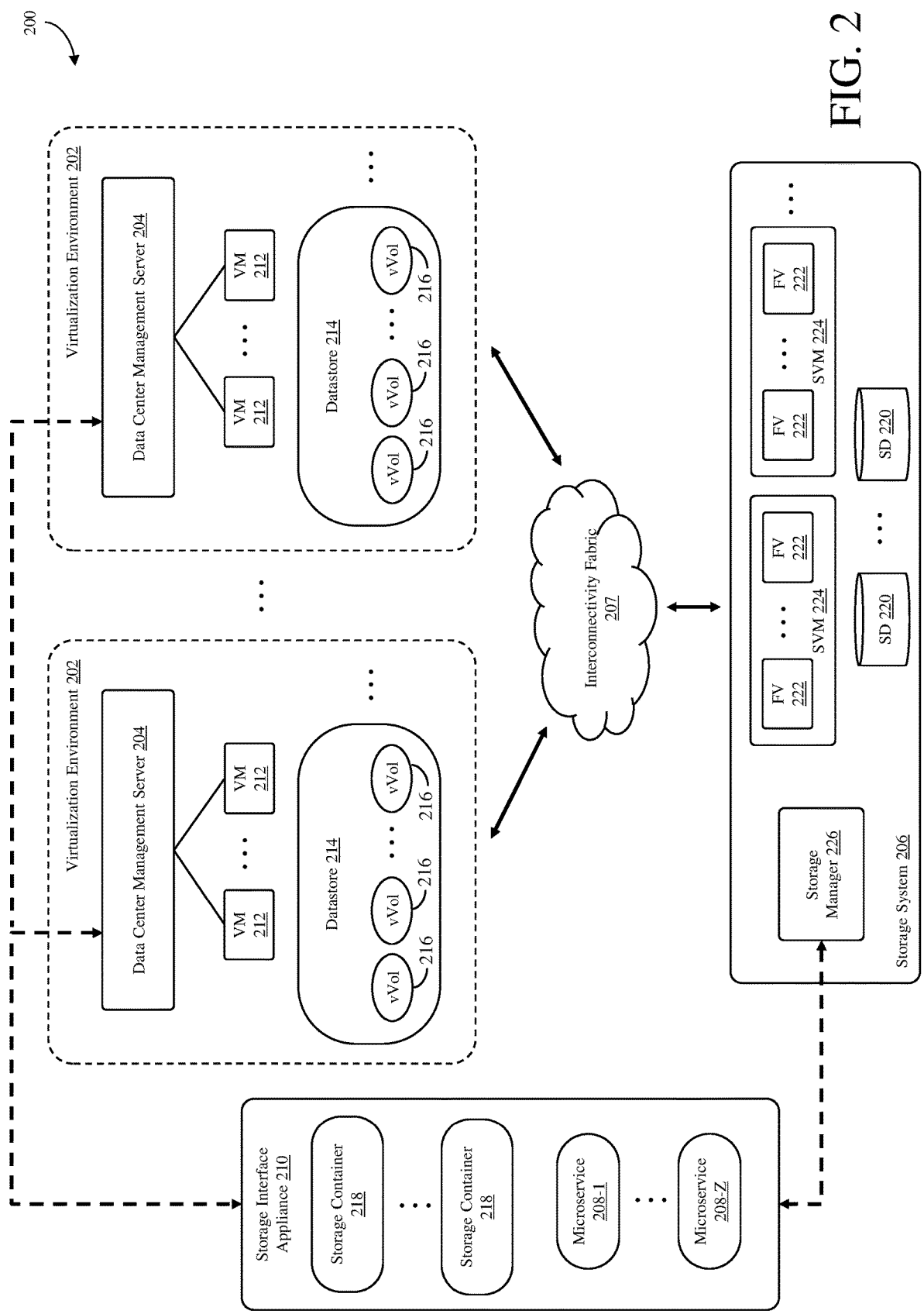
FIG. 2 shows a networked storage system with the microservice-based system implemented as a storage interface appliance in accordance with an embodiment of the invention.

Turning now to FIG. 2, the microservice-based system that is implemented as a storage interface appliance in a networked storage system 200 in accordance with an embodiment of the invention is illustrated. In the illustrated embodiment, the networked storage system 200 includes multiple virtualization environments 202, each of which may be created and managed by a data center management server 204. The virtualization environments 202 are connected to a storage system 206 via an interconnectivity fabric 207. The storage system 206 provides storage resources to the virtualization environments 202, which are managed by a storage interface appliance 210.

Each of the virtualization environments 202 may include one or more virtual computing instances 212, which may operate as virtualized computer systems. As used herein, the term "virtual computing instance" refers to any software processing entity that can run on a computer system, such as a software application, a software process, a virtual machine and a container. A virtual machine is an emulation of a physical computer system in the form of a software computer that, like a physical computer, can run an operating system and applications. A virtual machine may be comprised of a set of specification and configuration files and backed by the physical resources of a physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, California. A virtual container is a package that relies on virtual isolation to deploy and run applications that access a shared operating system (OS) kernel. An example of a virtual container is the virtual container created using a Docker engine made available by Docker, Inc. In this disclosure, the virtual computing instances will be described as being virtual machines (VMs), although embodiments of the invention described herein are not limited to VMs.

Each virtualization environment 202 may include one or more datastores 214, which include logical storage units in the form of virtual volumes (vVols) 216 for the VMs 212 or other programs/applications/processes in that virtualized environment. Unlike traditional logical unit number (LUN) and Network File System (NFS) based storage, the vVols functionality may not require preconfigured volumes on a storage side. Instead, vVols can use a storage container, which is a pool of raw storage capacity or an aggregation of storage capabilities that a storage system can provide to vVols. The vVols 216 in the datastores 214 may include different types of vVols or other types of logical storage units, which are used to store various data for the VMs. As an example, the vVols 216 in the datastores 214 may include data, configuration and snapshot vVols. The datastores 214 of the virtualization environments 202 are supported by the storage resources of the storage system 206, and managed by the storage interface appliance 210.

Although the logical storage units 216 are described herein as being vVols, in other embodiments, the logical storage units 216 may include different type of logical storage units, such as first class disks (FCDs).

In an embodiment, the virtualization environments 202, the storage system 206, the interconnectivity fabric 207 and/or the storage interface appliance 210 may be supported by a cloud provider that provides access to cloud-based storage via a cloud layer executed in a cloud computing environment. Cloud computing means computing capability that provides an abstraction between the computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" herein is intended to refer to a network, for example, the Internet and cloud computing allows shared resources.

Typical cloud computing providers deliver common business applications online which are accessed from another web service or software like a web browser, while the software and data are stored remotely on servers. The cloud computing architecture uses a layered approach for providing application services. The first layer is an application layer that is executed at client computers. After the application layer is a cloud platform and cloud infrastructure, followed by a "server" layer that includes hardware and computer software designed for cloud specific services.

Figure 3:
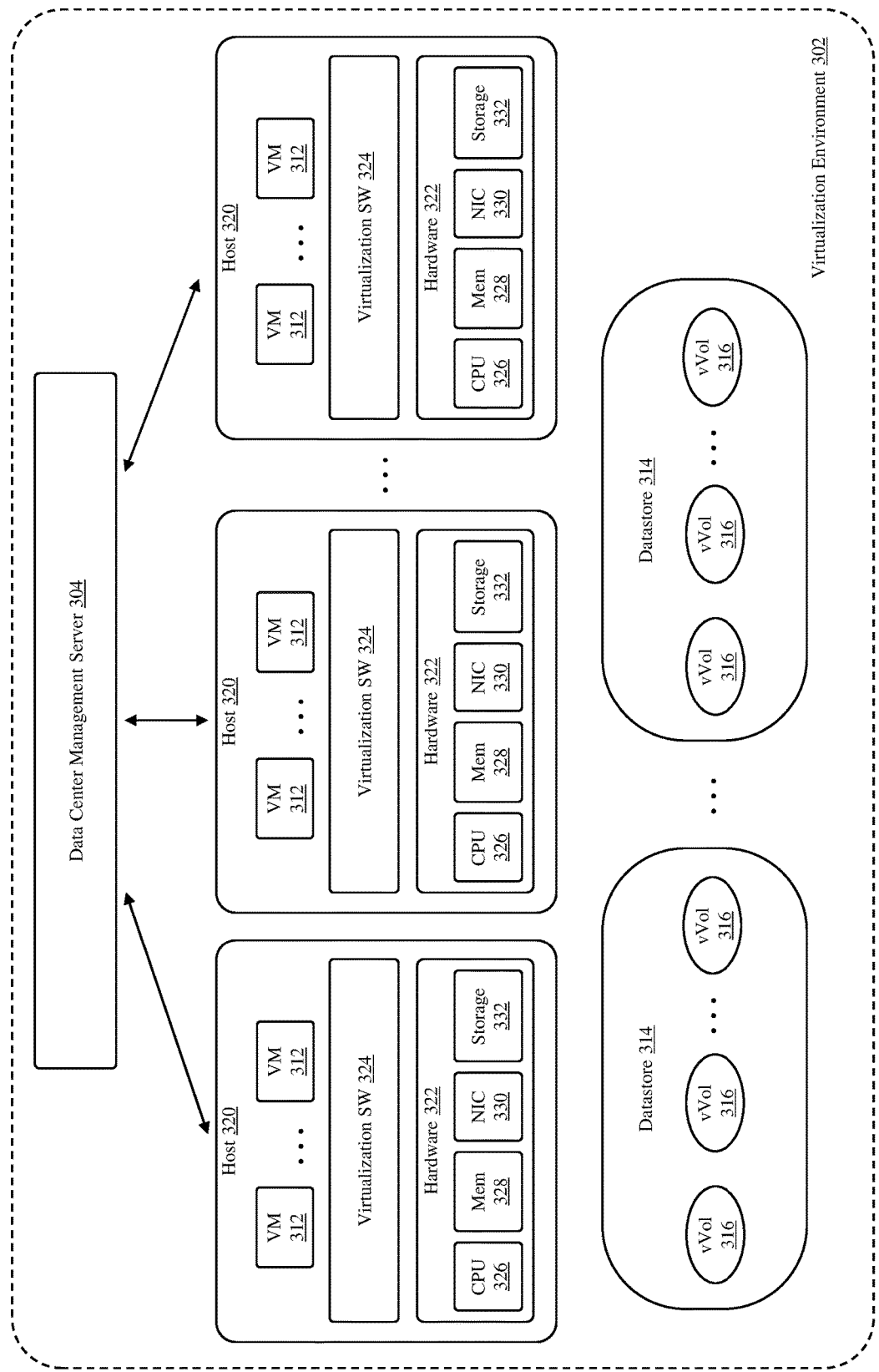
FIG. 3 shows a representative virtualization environment, which may be included in the networked storage system shown in FIG. 2, in accordance with an embodiment of the invention.

FIG. 3 shows a representative virtualization environment 302 that may be included in the networked storage system 200 in accordance with an embodiment of the invention. As shown in FIG. 3, the virtualization environment 302 includes a data center management server 304 and a number of host computers (hosts) 320. The virtualization environment 302 may include other components commonly found in virtualization environments in which VMs are deployed, such as components that provide and support software-defined networking.

The data center management server 304 operates to manage and monitor the hosts 320. The data center management server may be configured to allow an administrator to create one or more clusters of hosts, add hosts to the clusters and delete hosts from the clusters. The data center management server may also be configured to monitor the current configurations of the hosts and any virtual computing instances 312 running on the hosts, which are shown as VMs in the illustrated embodiment. The monitored configurations may include hardware and software configurations of each of the hosts. The monitored configurations may also include VM hosting information, i.e., which VMs are hosted or running on which hosts. The monitored configurations may also include information regarding the VMs running on the different hosts.

The data center management server 304 may also perform operations to manage the VMs 312 and the hosts 320. As an example, the data center management server may be configured to perform various resource management operations, including VM placement operations for either initial placement of VMs and/or load balancing. The process for initial placement of VMs may involve selecting suitable hosts for placement of the VMs based on, for example, memory and central processing unit (CPU) requirements of the VMs, the current memory and CPU loads on the hosts and the memory and CPU capacity of the hosts.

In some embodiments, the data center management server 304 may be a physical computer. In other embodiments, the data center management server may be implemented as one or more software programs running on one or more physical computers, such as the hosts 320, or running on one or more VMs, such as the VMs 312. In a particular implementation, the data center management server is a VMware vCenter™ server with at least some of the features available for such a server.

As illustrated in FIG. 3, each host 320 in the virtualization environment 302 includes hardware 322 and a virtualization software 324. The hardware 322 of each host 320 includes hardware components commonly found in a physical computer system, such as one or more processors 326, one or more system memories 328, one or more network interfaces 330 and one or more local storage devices 332 (collectively referred to herein as "local storage"). Each processor 326 can be any type of a processor, such as a CPU commonly found in a server. In some embodiments, each processor may be a multi-core processor, and thus, includes multiple independent processing units or cores. Each system memory 328, which may be random access memory (RAM), is the volatile memory of the host 320. The network interface 330 is an interface that allows the host computer to communicate with a network, such as the Internet. As an example, the network interface may be a network adapter. Each local storage device 332 is a nonvolatile storage, which may be, for example, a solid-state drive (SSD) or a magnetic disk.

The virtualization software (SW) 324 of the host 320, which may be referred to as a hypervisor or a virtual machine monitor (VMM), enables sharing of the hardware resources of that host by virtual computing instances, such as the VMs 312, running on the host computer. As an example, the virtualization software 324 may be a processor executed hypervisor layer provided by VMWare Inc., Hyper-V layer provided by Microsoft Corporation of Redmond, Washington or any other virtualization layer type. With the support of the virtualization software 324, the VMs 312 provide isolated execution spaces for guest software running on the VMs. In the illustrated embodiment, the virtualization software 324 is executed by the host 320. However, in other embodiments, the virtualization software 324 may be executed by an independent stand-alone computing system, often referred to as a hypervisor server or VMM server, where VMs are deployed on another computing system(s).

In an embodiment, the VMs 312 deployed in the virtualization environment 302 use vVols 316 in datastores 314, which are supported by a storage system, such as the storage system 206, for storing various information. Each VM 312 may use one or more vVols to store, but not limited to, disk data, configuration data and snapshot data. Thus, the vVols 316 may be used for VM files and virtual disks. In a particular implementation, the vVols 316 may be VMware vSphere Virtual Volumes.

In an embodiment, the hosts 320 have no direct access to the vVols 316 on the storage side. Instead, the hosts may use a logical input/output (I/O) proxy, which may be called a protocol endpoint, to communicate with a storage system, e.g., the storage system 206, on which the data of the vVols 316 are stored. The hosts may use these protocol endpoints to establish a data path on demand from the VMs 312 to their respective vVols.

Turning back to FIG. 2, the storage interface appliance 210 of the networked storage system 200 operates as an interface between the data center management servers 204 of the virtualization environments 202 and the storage system 206 to provide the vVol datastores 214 to the virtualization environments 202. In one aspect, the storage interface appliance 210 allows users to create and manage the vVols 216 for the virtualization environments 202, which are supported by the storage system 206, as described in more detail below. In order to create and manage the vVols 216, the storage interface appliance 210 creates storage containers 218, which represent the datastores 214 that are available to the virtualization environments 202. In an embodiment, the storage interface appliance 210 may be or may include a virtual volume storage provider, which may be called a vSphere APIs for Storage Awareness (VASA) provider. Thus, the storage interface appliance 210 may be configured to execute various capabilities found in a conventional VASA provider. In the illustrated embodiment, the storage interface appliance 210 is a microservice-based system. As such, the storage interface appliance 210 includes a number of microservices 208-1 ... 208 -Z, which provides services to authorized clients. These microservices may include, but not limited to, a common service, a datastore service, a compliance service and a provisioning service.

Components in the virtualization environments 202, such as the data center management servers 204 and the VMs 212, are communicably coupled to the storage system 206. In the illustrated embodiment, these components can access the storage system 206 through the interconnectivity fabric 207, which may include one or more local area networks (LANs), one or more wide area networks (WANs), the Internet and/or other network connections. As described herein, the term "communicably coupled" may refer to a direct connection, a network connection, or other connections to enable communication between computing and network devices.

The storage system 206 has access to a set of mass storage devices (SDs) 220, which may be used to store data for the vVols 216, as well as other data. The storage devices 220 may include writable storage device media, such as solid-state drives, storage class memory, magnetic disks, video tape, optical, DVD, magnetic tape, non-volatile memory devices for example, self-encrypting drives, or any other storage media adapted to store structured or non-structured data. The storage devices 220 may be organized as one or more groups of Redundant Array of Independent (or Inexpensive) Disks (RAID). The various aspects disclosed are not limited to any specific storage device or storage device configuration.

In the illustrated embodiment, the storage system 206 includes a number of flexible logical storage units in the form of flexible volumes (FVs) 222, which may increase or decrease their size as needed. The flexible volumes 222 may be created when the storage containers 218 for the datastores 214 are created. One storage container may have more than one flexible volumes, each of which can support one or more vVols. In an embodiment, a flexible volume may be a data container associated with a storage virtual computing instance 224, which may have multiple flexible volumes. In the illustrated embodiment, the storage virtual computing instance 224 is shown as being a storage VM (SVM). However, in other embodiments, the storage virtual computing instance 224 may be a different type of virtual computing instance. In addition, there may be multiple storage virtual computing instances 224 deployed in the storage system 206. In a particular implementation, the flexible volumes 222 may be FlexVol® volumes, which are provided by NetApp Inc.

The storage system 206 further includes a storage manager 226, which operates to control and manage the storage devices 220 to support the flexible volumes 222 in the virtual computing instance 224. The storage manager 226 may communicate with the storage interface appliance 210 in order to manage the vVols 216 presented to the virtualization environments 202 via their data center management servers 204. In an embodiment, the storage manager 226 may include a storage operating system for storing and retrieving data on behalf of one or more client computing systems, e.g., the VMs 212. Although the storage system 206 is shown with a single storage manager, in other embodiments, the storage system 206 may include a cluster of storage controllers, which may be associated with cluster interconnect switches connecting the storage controllers. In a particular implementation, the storage manager 226 may include one or more storage controllers available from NetApp, Inc.

The storage system 206 may be used to store and manage information at the storage devices 220 based on requests generated by applications executed on the VMs 212 in the virtualization environments 202 or any other entities. The requests may be based on file-based access protocols, for example, the Common Internet File System (CIFS) protocol or Network File System (NFS) protocol, over the Transmission Control Protocol/Internet Protocol (TCP/IP). Alternatively, the requests may use block-based access protocols for storage area network (SAN) storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests from the virtualization environments 202 are sent over the interconnectivity fabric 207 to the storage system 206. The I/O requests are received by the storage system 206, where one or more I/O commands are issued to the storage devices 220 to read or write the data on behalf of the requesting entities. Response to the I/O requests are then transmitted back to the requesting entities over the interconnectivity fabric 207.

Although the storage system 206 is shown as a stand-alone system, i.e., a non-cluster-based system, in other embodiments, the storage system 206 may have a distributed architecture; for example, a cluster-based system that may include a separate network module and storage module. Briefly, the network module is used to communicate with the requesting entities, while the storage module is used to communicate with the storage devices 220.

Alternatively, the storage system 206 may have an integrated architecture, where the network and data components are included within a single chassis. The storage system 206 may further be coupled through a switching fabric to other similar storage systems (not shown), which have their own local storage devices. In this way, all the storage devices can form a single storage pool, to which any client of any of the storage servers has access.

As noted above, the microservice-based system 102 in the computing environment 100 may be implemented as a storage interface appliance, such as the storage interface appliance 210 of the networked storage system 200. In such an implementation, the clients 104 and the external IDPs 106 may be running in the virtualization environments. However, the microservice-based system 102 may be implemented as any device or system that provides services using independent microservices, which may require authentication and/or authorization from external IDPs. Prior to the adaptive aspects of the present disclosure, each microservice may have to configured or programmed to interface directly with one or more external IDPs for authentication and/or authorization. Thus, there is significant overhead in the microservices to perform these functions. In addition, each microservice may need to be updated if there are changes to the authentication and/or authorization processes with the external IDPs or if new externals IDPs are onboarded to the microservice-based system 102. The innovative technology disclosed herein provides efficient means to provide authentication and/or authorization for the microservices in the microservice-based system 102, even when external IPDs are involved, as described in detail below.

Figure 4:
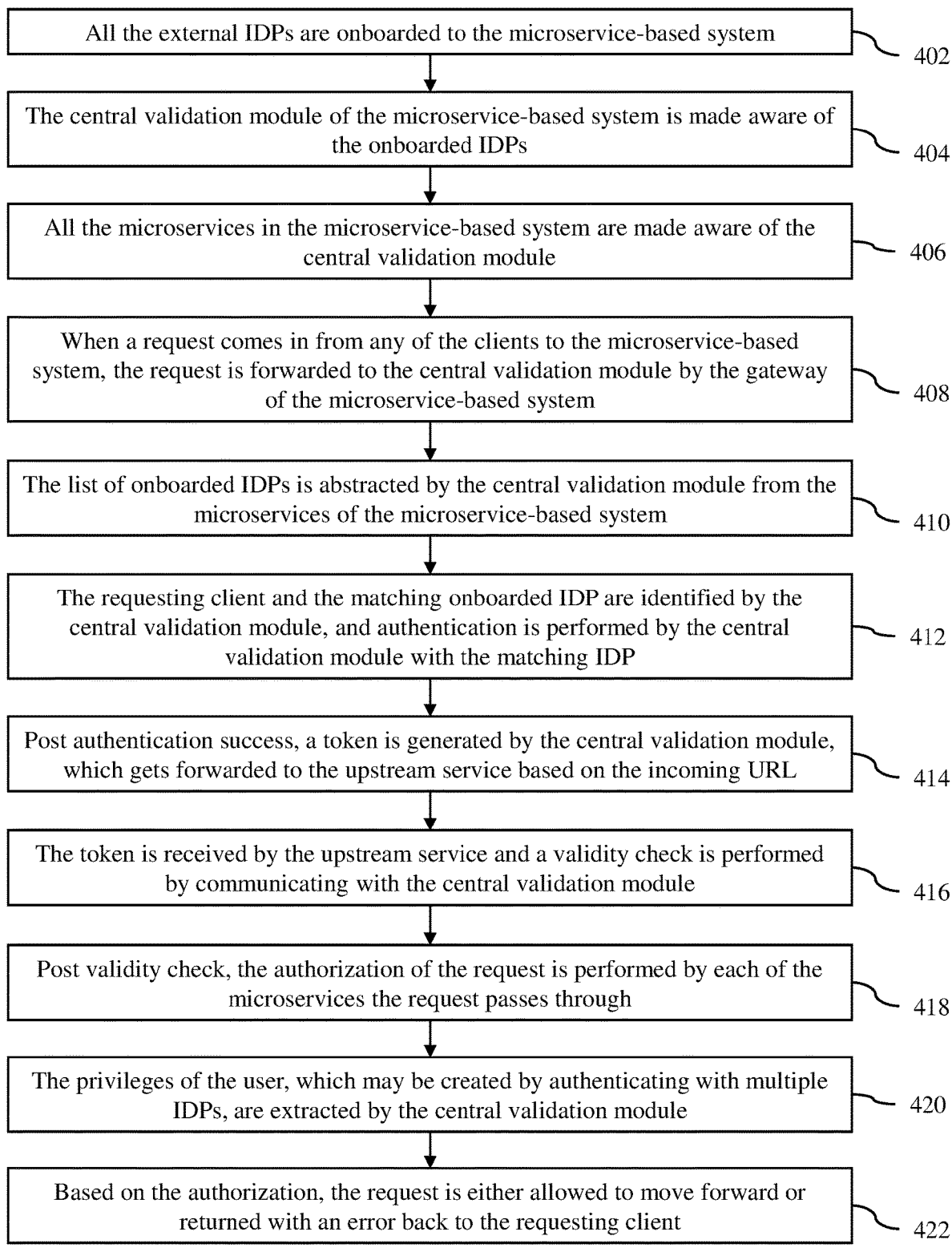
FIG. 4 is a high-level flow diagram of a method of processing a request from a client at the microservice-based system in accordance with an embodiment of the invention.

FIG. 4 is a high-level flow diagram of a method of processing a request from a client at the microservice-based system 102 in accordance with an embodiment of the invention. The process begins at step 402, where all the external IDPs 106 are onboarded to the microservice-based system 102. The onboarding process may involve getting various information about the external IDPs.

Next, at step 404, the central validation module 110 of the microservice-based system 102 is made aware of the onboarded IDPs 106. This step may involve providing the information about the external IDPs to the central validation module 110.

Next, at step 406, all the microservices 108 in the microservice-based system 102 are made aware of the central validation module 110. This step may involve providing information about the central validation module to the microservices.

Next, at step 408, when a request comes in from any of the clients 104 to the microservice-based system 102, the request is forwarded to the central validation module 110 by the gateway 112 of the microservice-based system.

Next, at step 410, the list of onboarded IDPs 106 is abstracted by the central validation module 110 from the microservices 108 of the microservice-based system 102. Thus, the microservices 108 do not know anything about the external IDPs 106.

Next, at step 412, the requesting client and the matching onboarded IDP are identified by the central validation module 110, and authentication is performed by the central validation module with the matching IDP.

Next, at step 414, post authentication success, a token is generated by the central validation module 110, which gets forwarded to the upstream service based on the incoming a uniform resource locator (URL) associated with the request.

Next, at step 416, the token is received by the upstream service and a validity check is performed by communicating with the central validation module 110. The upstream service is able to interface with the central validation module because it was made aware to all the microservices. The validity check may be based on application identification (ID), based on validity of the token and/or based on certificate signature.

Next, at step 418, post validity check, the authorization of the request is performed by each of the microservices the request passes through.

Next, at step 420, the privileges of the user (via the client), which may be created by authenticating with multiple IDPs, are extracted by the central validation module 110. Alternatively, the privileges may be extracted by a middleware/authentication utility using custom logic.

Next, at step 422, based on the authorization, the request is either allowed to move forward or returned with an error back to the requesting client.

Examples of the clients 104 in the computing environment 100 include, but not limited to, an ONTAP Tools for VMware vSphere (OTV) manager, a remote plugin (RP) vCenter client, a site recovery manager (SRM) server, an application programming interface (API)/Automation client, a NetApp BlueXP™ client and a VMware ESXi™ host. Some of these clients are further described below.

The OTV manager is the manager user interface (UI) for the VASA provider. The credentials for the OTV manager may be onboarded during the deployment process. These credentials may be made away to the central validation module 110 through a third-party database service. This client when interacting with the VASA provider will send (i) username and (ii) password for authentication.

For the RP vCenter client, the VMware vCenter® server supports remote plugin mechanism. The UI calls coming in from the vCenter server have a different set of credentials to be validated against the vCenter single sign-on (SSO). The vCenter IDP onboarding process takes care of making the vCenter IDP available to the central validation module 110. This client when interacting with the VASA provider will send (i) vmware-api-session-id, (ii) vcenter-guid and (iii) vmware-api-endpoint-url for authentication.

The SRM server is a client to provide site replication. This client authenticates with the VASA provider using a certificate. The certificate onboarding process takes care of onboarding the certificate and making it aware to the central validation module 110 so that the central validation module can authenticate this client. This client when interacting with the VASA provider will send (i) certificate and (ii) client-id for authentication.

The API/Automation client uses vCenter credentials to gain access to the VASA provider API. The vCenter IDP onboarding process takes care of making the vCenter IDP available to the central validation module 110. This client when interacting with the VASA provider will send (i) vcenter username and (ii) vcenter password for authentication.

The ESXi host when interacting with the VASA provider will send (i) vasasessionid for authentication.

Examples of the external IDPs 106 include, but not limited to, an active directory federation services (ADFS) IDP, a vCenter IDP, a BlueXP Authentication service and Auth0 IDP. The vCenter IDP uses SSO server to authenticate with the following authenticating credential pairs: (1) pair 1=(i) username and (ii) password, (2) pair 2=(i) vmware-api-session-id and (ii) vcenter-guid, and (3) pair 3=(i) vmware-api-session-id, (ii) vcenter-guid and (iii) vmware-api-endpoint-url.

Figure 5:
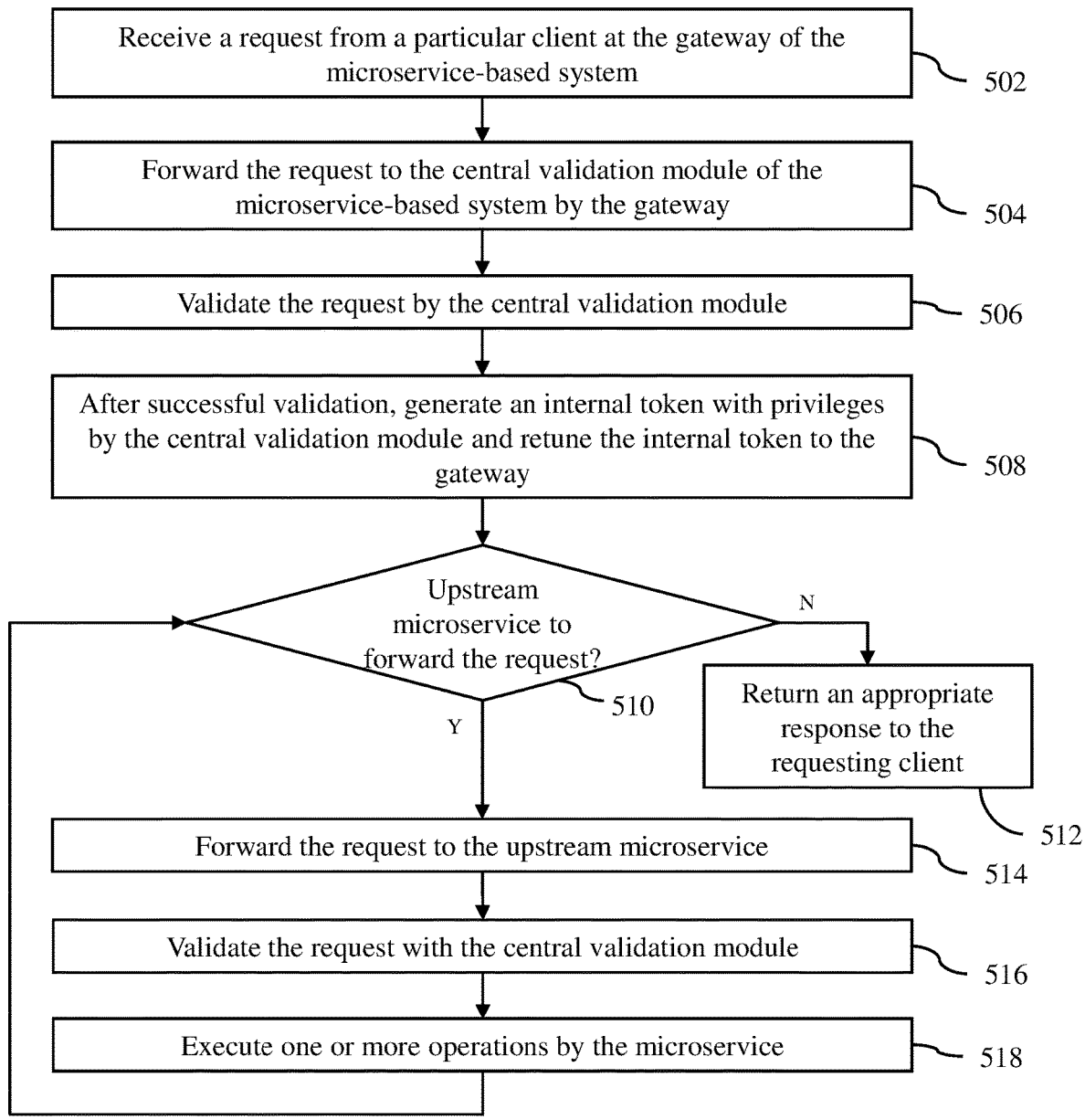
FIG. 5 is a flow diagram of a method of processing a request from a client at the microservice-based system that does not require authentication/authorization from any of the external IDPs in accordance with an embodiment of the invention.

FIG. 5 is a flow diagram of a process of executing a request from one of the clients 104 to the microservice-based system 102 that does not require authentication/authorization from any of the external IDPs in accordance with an embodiment of the invention. This process will be described with reference to FIG. 6, which shows the computing environment 100 with relevant components to describe the process. Thus, some of the components of the computing environment 100 are omitted in FIG. 6.

Figure 6:
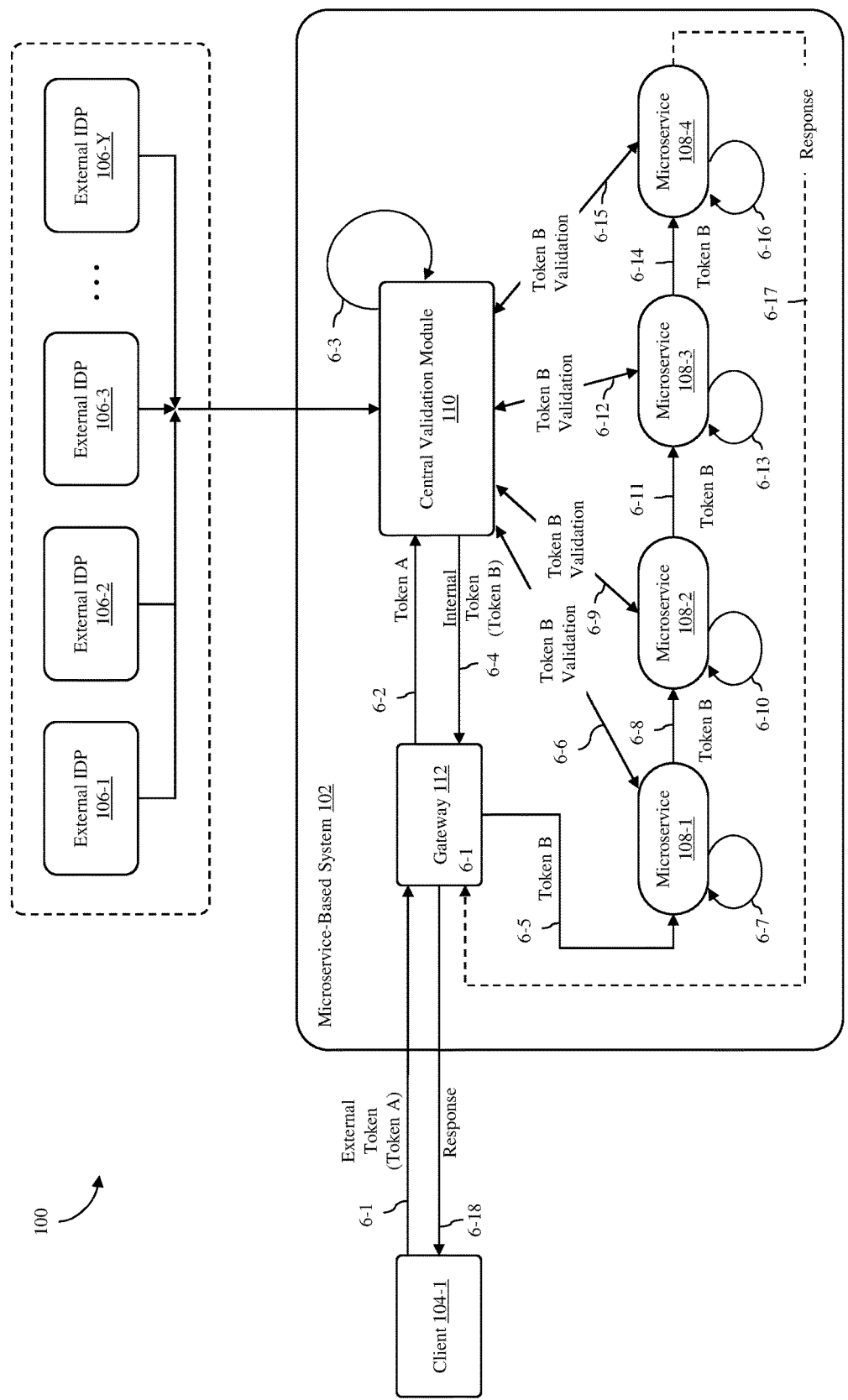
FIG. 6 illustrates the method of FIG. 5 using an example in accordance with an embodiment of the invention.

The process begins at step 502, where the request from a particular client is received at the gateway 112 of the microservice-based system 102. As an example, the particular client may be an OTV manager client. This step is indicated in FIG. 6 by the arrow 6-1 from a requesting client 104-1 to the gateway 112 of the microservice-based system 102. In FIG. 6, the request may be in the form of an external token (token A), which may be a JWT.

Next, at step 504, the request is forwarded to the central validation module 110 of the microservice-based system 102 by the gateway 112. This step is indicated in FIG. 6 by the arrow 6-2 from the gateway 112 to the central validation module 110 of the microservice-based system 102.

Next, at step 506, the request is validated internally by the central validation module 110. This step is indicated in FIG. 6 by the circular arrow 6-3 at the central validation module 110, which illustrates that the validation is being executed internally at the microservice-based system 102. In an embodiment, the validation may involve checking the credentials associated with the request client using a third-party database service, such as the HashiCorp Vault system.

Next, at step 508, an internal token with privileges is generated by the central validation module 110 and returned to the gateway 112. This step is indicated in FIG. 6 by the arrow 6-4 from the central validation module 110 to the gateway 112, which shows that an internal token (token B) is being transmitted back to the gateway 112.

Next, at step 510, a determination is made by the gateway 112 whether there is an upstream microservice to forward the request, which may be the first or subsequent microservice to process the request. In an embodiment, the determination of the upstream microservice may be based on the incoming URL, which identifies the requesting client. As an example, depending on whether the incoming URL identifies the requesting client as an OTV manager client, an RP vCenter client or an API/Automation client, the upstream microservice may be a particular VASA provider internal microservice running in the microservice-based system.

If there is no upstream microservice to forward the request, i.e., all the operations pertaining to the request have been completed, then the process proceeds to step 512, where an appropriate response is returned to the requesting client because there are no more microservices to be called for the request, e.g., the request has been completed. However, if there is an upstream microservice to forward the request, then the process proceeds to step 514. In the example of FIG. 6, there are a number of upstream microservices 108-1, 108-2, 108-3 and 108-4 that need to process or handle the request. The first upstream microservice is the microservice 108-1.

Next, at step 514, the request in the form of a token is forwarded to the upstream microservice running in the microservice-based system 102. If the upstream microservice is the first microservice to handle the request, then the request may be forwarded to the upstream microservice by the gateway 112. However, if the upstream microservice is a subsequent microservice to handle the request, then the request may be forwarded to the upstream microservice by the current microservice handling the request. In another embodiment, a separate orchestrator (not shown) may handle the forwarding of the request to the upstream microservice. This step is indicated in FIG. 6 by the arrow 6-5 from the gateway 112 to the microservice 108-1, since this is the first microservice to process the request.

Next, at step 516, when the request in the form of the internal token is received by the current microservice, the request is validated with the central validation module 110. The validity check may be based on application ID, based on validity of the token and/or based on certificate signature. This step is indicated in FIG. 6 by the arrow 6-6 between the microservice 108-1 and the central validation module 110.

Next, at step 518, after the request has been validated, one or more operations may be executed by the current microservice. The operations may vary depending on the current microservice. This step is indicated in FIG. 6 by the circular arrow 6-7, which illustrates that one or more operations are being executed by the microservice 108-1.

The process then proceeds back to step 510 to determine whether there is another upstream microservice for the request to be completed. If there is another upstream microservice, then the process performs steps 514-518. However, if there is no other upstream microservice for the request, then the process proceeds to step 512 to return an appropriate response to the requesting client via the gateway 112.

In FIG. 6, there are three subsequent microservices 108-2, 108-3 and 108-4 that need to process the request. Thus, steps 514-518 are repeated for each of the microservices 108-2, 108-3 and 108-4. These steps are indicated in FIG. 6 by the arrows 6-8, 6-9 and 6-10 for the microservice 108-2, the arrows 6-11, 6-12 and 6-13 for the microservice 108-3, and the arrows 6-14, 6-15 and 6-16 for the microservice 108-4. Since the microservice 108-4 is the last microservice that needs to process the request, an appropriate response is transmitted back to the requesting client 104-1 via the gateway 112, as indicated by the arrow 6-17 from the microservice 108-4 to the gateway 112 and the arrow 6-18 from the gateway 112 to the requesting client 104-1. In some embodiments, the response may simply be a notification that the requested services have been completed. In other embodiments, the response may also include information or data that is the result of the requested services being executed.

Figure 7:
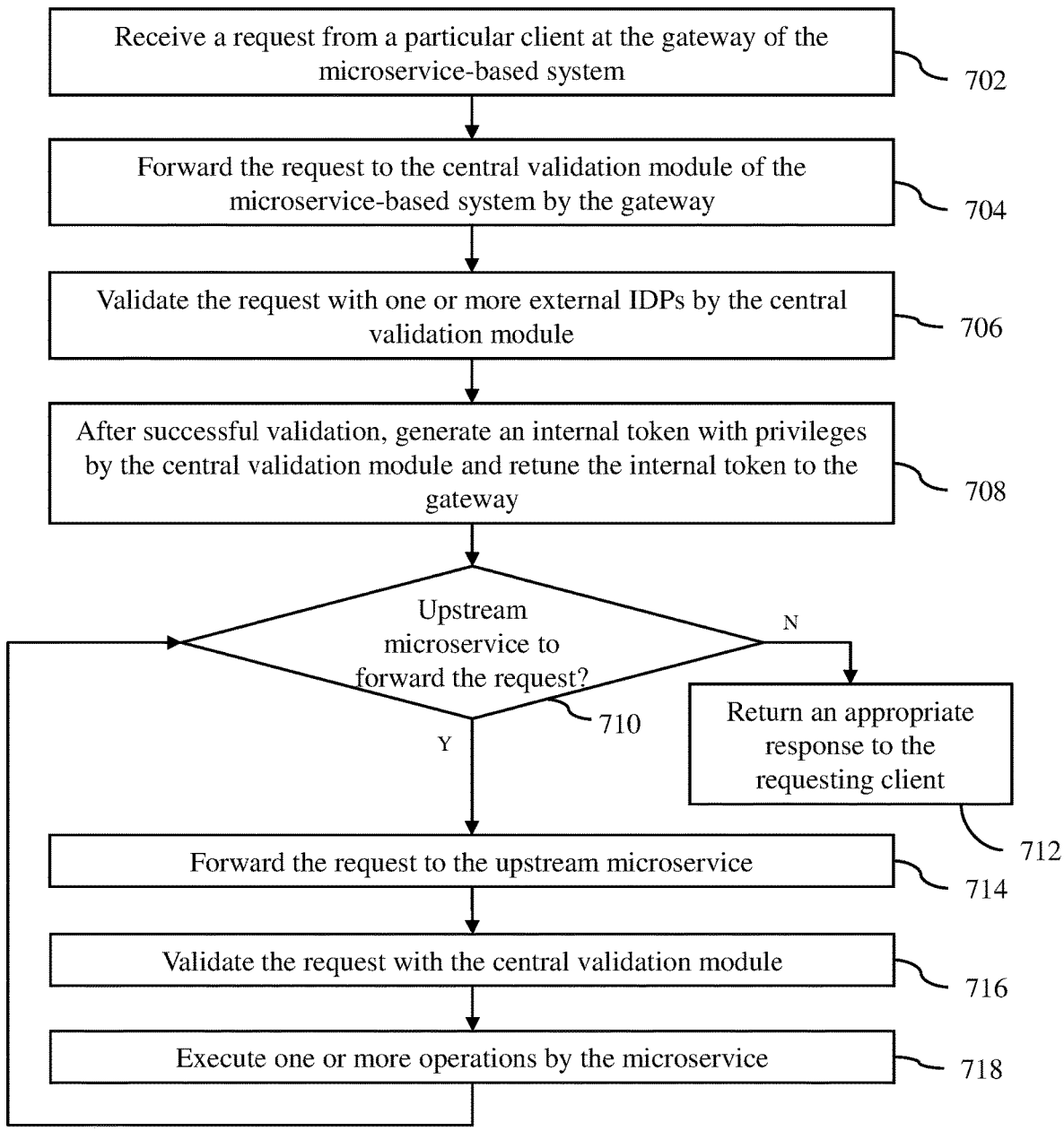
FIG. 7 is a flow diagram of a method of processing a request from a client at the microservice-based system that does require authentication/authorization from any of the external IDPs in accordance with an embodiment of the invention.

FIG. 7 is a flow diagram of a process of executing a request from a particular client to the microservice-based system that does require authentication/authorization from one or more external IDPs in accordance with an embodiment of the invention. This process will be described with reference to FIG. 8, which shows the computing environment 100 with relevant components for the process. Thus, some of the components of the computing environment are omitted in FIG. 8, similar to FIG. 6.

Figure 8:
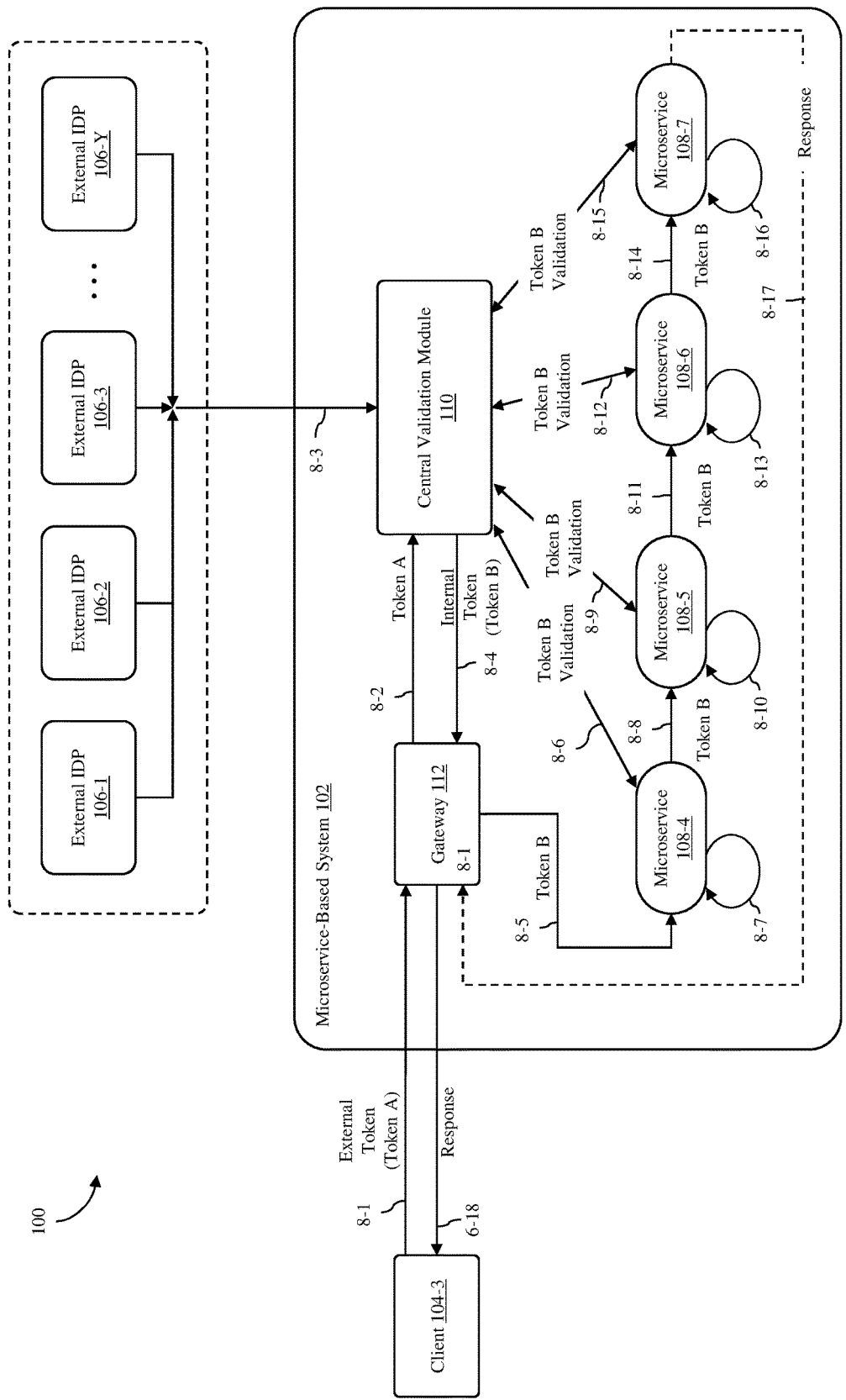
FIG. 8 illustrates the method of FIG. 7 using an example in accordance with an embodiment of the invention.

The process begins at step 702, where the request from a particular client is received at the gateway 112 of the microservice-based system 102. As an example, the particular client may be an RP vCenter client or an API automation client. This step is indicated in FIG. 8 by the arrow 8-1 from a requesting client 104-3 to the gateway 112 of the microservice-based system 102. In FIG. 8, the request may be in the form of an external token (token A), which may be a JWT.

Next, at step 704, the request is forwarded to the central validation module 110 of the microservice-based system 102 by the gateway 112. This step is indicated in FIG. 8 by the arrow 8-2 from the gateway 112 to the central validation module 110 of the microservice-based system 102.

Next, at step 706, the request is validated with one or more appropriate external IDPs 106 by the central validation module 110. Depending on the requesting client, the appropriate external IDP(s) will vary. For example, if the client is an RP vCenter client, then the external IDP is VMware vCenter. This step involves a communication between the central validation module 110 and the external IDP(s) to receive authentication and/or authorization for the requesting client. This step is indicated in FIG. 8 by the arrow 8-3 between the central validation module 110 and one or more of the external IDPs 106-1, 106-2, 106-3 . . . 106-Y. In an embodiment, the validation may involve sending the credentials associated with the requesting client to each of the required external IDPs.

Next, at step 708, after a successful validation with the external IDP, an internal token with privileges is generated by the central validation module 110 and returned to the gateway 112. This step is indicated in FIG. 8 by the arrow 8-4 from the central validation module 110 to the gateway 112, which shows that an internal token (token B) is being transmitted back to the gateway 112.

Next, at step 710, a determination is made by the gateway 112 whether there is an upstream microservice to forward the request, which may be the first microservice to process the request or a subsequent microservice to process the request. In an embodiment, the determination of the upstream microservice may be based on the incoming URL, which identifies the requesting client. As an example, depending on whether the incoming URL identifies the requesting client as an RP vCenter client or an API/Automation client, the upstream microservice may be a particular VASA provider internal microservice running in the microservice-based system.

If there is no upstream microservice to forward the request, i.e., all the operations pertaining to the request have been completed, then the process proceeds to step 712, where an appropriate response is returned to the requesting client because there are no more microservices to be called for the request, e.g., the request has been completed. However, if there is an upstream microservice to forward the request, then the process proceeds to step 714. In the example of FIG. 8, there are a number of upstream microservices 108-4, 108-5, 108-6 and 18-7 that need to process or handle the request. The first upstream microservice is the microservice 108-4.

Next, at step 714, the request in the form of a token is forwarded to the upstream microservice running in the microservice-based system 102. If the upstream microservice is the first microservice to handle the request, then the request may be forwarded to the upstream microservice by the gateway 112. However, if the upstream microservice is a subsequent microservice to handle the request, then the request may be forward to the upstream microservice by the current microservice handling the request. In another embodiment, a separate orchestrator (not shown) may handle the forwarding of the request to the upstream microservice. This step is indicated in FIG. 8 by the arrow 8-5 from the gateway 112 to the microservice 108-4, since this is the first microservice to process the request.

Next, at step 716, when the request in the form of a token is received by the microservice, the request is validated with the central validation module 110. The validity check may be based on application ID, based on validity of the token and/or based on certificate signature. This step is indicated in FIG. 8 by the arrow 8-6 between the microservice 108-4 and the central validation module 110.

Next, at step 718, after the request has been validated, one or more operations are executed by the microservice. The operations may vary depending on the microservice. This step is indicated in FIG. 8 by the circular arrow 8-7, which illustrates that one or more operations are being executed by the microservice 108-4.

The process then proceeds back to step 710 to determine whether there is another upstream microservice for the request to be completed. If there is another upstream microservice, then the process performs steps 714-718. However, if there is no other upstream microservice for the request, then the process proceeds to step 712 to return an appropriate response to the requesting client via the gateway.

Similar to FIG. 6, in FIG. 8, there are three subsequent microservices 108-5, 108-6 and 108-7 that need to process the request. Thus, steps 714-718 are repeated for each of these microservices. These steps are indicated in FIG. 8 by the arrows 8-8, 8-9 and 8-10 for the microservice 108-5, the arrows 8-11, 8-12 and 8-13 for the microservice 108-6, and the arrows 8-14, 8-15 and 8-16 for the microservice 108-7.

Since the microservice 108-7 is the last microservice that needs to process the request, an appropriate response is transmitted back to the requesting client 104-3 via the gateway 112, as indicated by the arrow 8-17 from the microservice 108-7 to the gateway 112 and the arrow 8-18 from the gateway 112 to the requesting client 104-3.

Specific workflow examples of the request processing executed by the microservice-based system 102 are now described for requests from an OTV manager, an RP vCenter client, an SRM server, an API/Automation client, a NetApp BlueXP™ client and a VMware ESXi™ host.

For an OTV manager, OTV manager credentials are onboarded during a deployment process, which may be made aware to the central validation module 110 using a third-party database. When an incoming call with credentials reaches the gateway 112, the gateway identifies the client and asks the central validation module to issue a JWT. The central validation module will then validate against the credentials in the third-party database and issue a JWT, which is passed to a particular microservice in the microservice-based system 102. The microservice will validate the JWT against a public key issued by the central validation module. On success, the request is processed.

For an RP vCenter client, a remote plugin is registered with the VASA provider during a registration process, where a UI bundle is loaded into the vCenter server at the same time. The vSphere IDP is then onboarded to the microservice-based system 102. The RV vCenter client, when it tries to connect with a VASA provider, will send (i) vmware-api-session-id, (ii) vcenter-guid and (iii) vmware-api-endpoint-url for authentication. When an incoming call with credentials reaches the gateway 112, the gateway identifies the client and asks the central validation module 110 to issue a JWT. The central validation module will then validate against the onboarded vSphere IDP and issue a JWT, which is passed to a particular microservice in the microservice-based system 102. The microservice will validate the JWT against a public key issued by the central validation module. On success, the request is processed.

For an SRM server, OTV manager/admin credentials are onboarded during a deployment. In addition, a certificate is onboarded to the VASA provider, which may be made available to the central validation module 110 using a third-party database. The SRM server, when it tries to connect with a VASA provider, will send (i) certificate and (ii) client-id for authentication. When an incoming call with credentials reaches the gateway 112, the gateway identifies the client and asks the central validation module 110 to issue a JWT. The central validation module will then validate against the onboarded certificate, which is made available through the third-party database to the central validation module. The JWT is then passed to a particular microservice in the microservice-based system 102. The microservice will validate the JWT against a public key issued by the central validation module. On success, the request is processed.

For an API/Automation client, a vSphere IDP is onboarded to the microservice-based system 102. The API/Automation client, when it tries to connect with a VASA provider, will send (i) username and (ii) password for authentication. When an incoming call with credentials reaches the gateway 112, the gateway identifies the client and asks the central validation module 110 to issue a JWT. The central validation module will then validate against the onboarded vSphere IDP and issue a JWT, which is passed to a particular microservice in the microservice-based system 102. The microservice will validate the JWT against a public key issued by the central validation module. On success, the request is processed.

For a BlueXP client, a BlueXP IDP is onboarded to the microservice-based system 102. The BlueXP client, when it tries to connect with a VASA provider, will send (i) Auth0 token for authentication. When an incoming call with credentials reaches the gateway 112, the gateway identifies the client and asks the central validation module 110 to issue a JWT. The central validation module will then validate against the onboarded vSphere IDP and issue a JWT, which is passed to a particular microservice in the microservice-based system 102. The microservice will validate the JWT against a public key issued by the central validation module. On success, the request is processed.

For an ESXi client, a VASA provider is registered with the vCenter server during a registration process. The ESXi client, when it tries to connect with a VASA provider, will send (i) VASASESSIONID for authentication. An incoming call with credentials will reach a VASA provider service directly, which will identify the client and asks the central validation module 110 to issue a JWT using an internally generated api-key. The central validation module will then validate against the api-key, which is made valuable by a third-party database to the central validation module 110, and issue a JWT, which is passed to a VASA service in the microservice-based system 102. The VASA service will use the same JWT to interface with multiple microservices. Each microservice will validate the JWT against a public key issued by the central validation module. On success, the request is processed.

In an embodiment, the ESXi client, i.e., the ESXi host, communicates with the VASA provider over the control path using the VASA API, which is a set of Simple Object Access Protocol (SOAP)-based APIs. This communication is typically done over a secure Hypertext Transfer Protocol Secure (HTTPS) connection to ensure the integrity and confidentiality of the data being exchanged. The communication will happen through the gateway 112, but it will be a direct passthrough over the 443 port. The VASA provider validates the session and proceeds with the communication.

Figure 9:
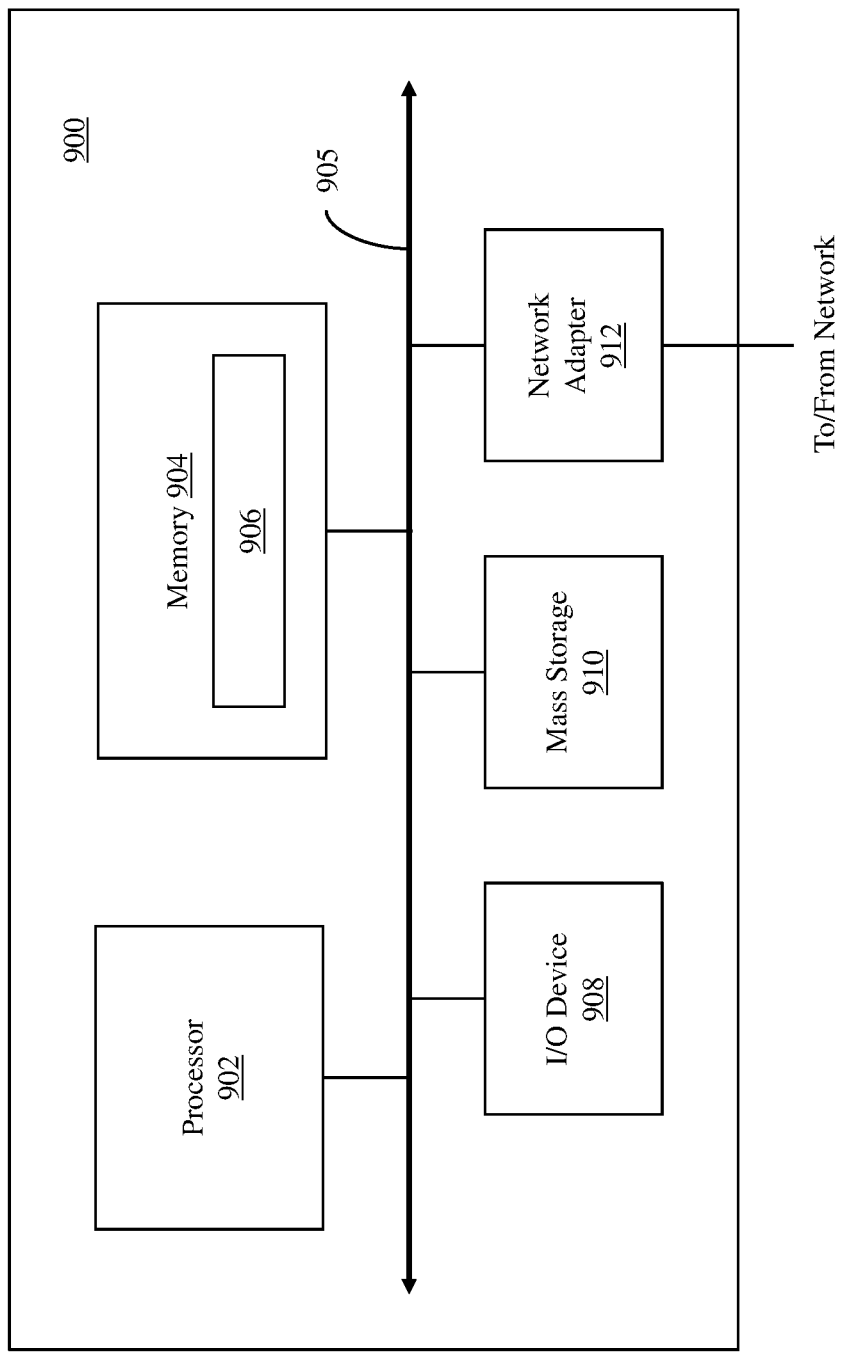
FIG. 9 is a high-level block diagram showing an example of the architecture of a processing system in accordance with an embodiment of the invention.

FIG. 9 is a high-level block diagram showing an example of the architecture of a processing system 900 in accordance with an embodiment of the invention, in which executable instructions for operations as described above can be implemented. The processing system 900 can represent modules of the microservice-based system 102, the clients 104, the external IDPs 106, the data center management servers 204, the storage system 206 and the storage interface appliance 210. Note that certain standard and well-known components which are not germane to the present invention are not shown in FIG. 9.

The processing system 900 includes one or more processors 902 and memory 904, coupled to a bus system 905. The bus system 905 shown in FIG. 9 is an abstraction that represents any one or more separate physical buses and/or point-to-point connections, connected by appropriate bridges, adapters and/or controllers. The bus system 905, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 902 are the central processing units (CPUs) of the processing system 900 and, thus, control its overall operation. In certain aspects, the processors 902 accomplish this by executing programmable instructions stored in the memory 904. Each processor 902 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 904 represents any form of random-access memory (RAM), read-only memory (ROM), flash memory, or the like, or a combination of such devices. The memory 904 includes the main memory of the processing system 900. Instructions 906 which implements techniques introduced above may reside in and may be executed by the processors 902 from the memory 904. For example, the instructions 906 may include code used for executing the steps of FIGS. 4, 5 and 7 as well running various applications/processes running in the microservice-based system 102 and/or the networked storage system 200, such as the gateway 112, the microservices 108, the central validation module 110, the data center management servers 204, the VMs 212, the storage interface appliance 210 and the storage manager 226.

Also connected to the processors 902 through the bus system 905 are one or more internal mass storage devices 910, and a network adapter 912. The internal mass storage devices 910 may be or may include any conventional medium for storing large volumes of data in a non-volatile manner, such as one or more magnetic or optical based disks. The network adapter 912 provides the processing system 900 with the ability to communicate with remote devices (e.g., storage servers) over a network and may be, for example, an Ethernet adapter, a Fibre Connector (FC) adapter, or the like. The processing system 900 also includes one or more input/output (I/O) devices 908 coupled to the bus system 905. The I/O devices 908 may include, for example, a display device, a keyboard, a mouse, etc.

Figure 10:
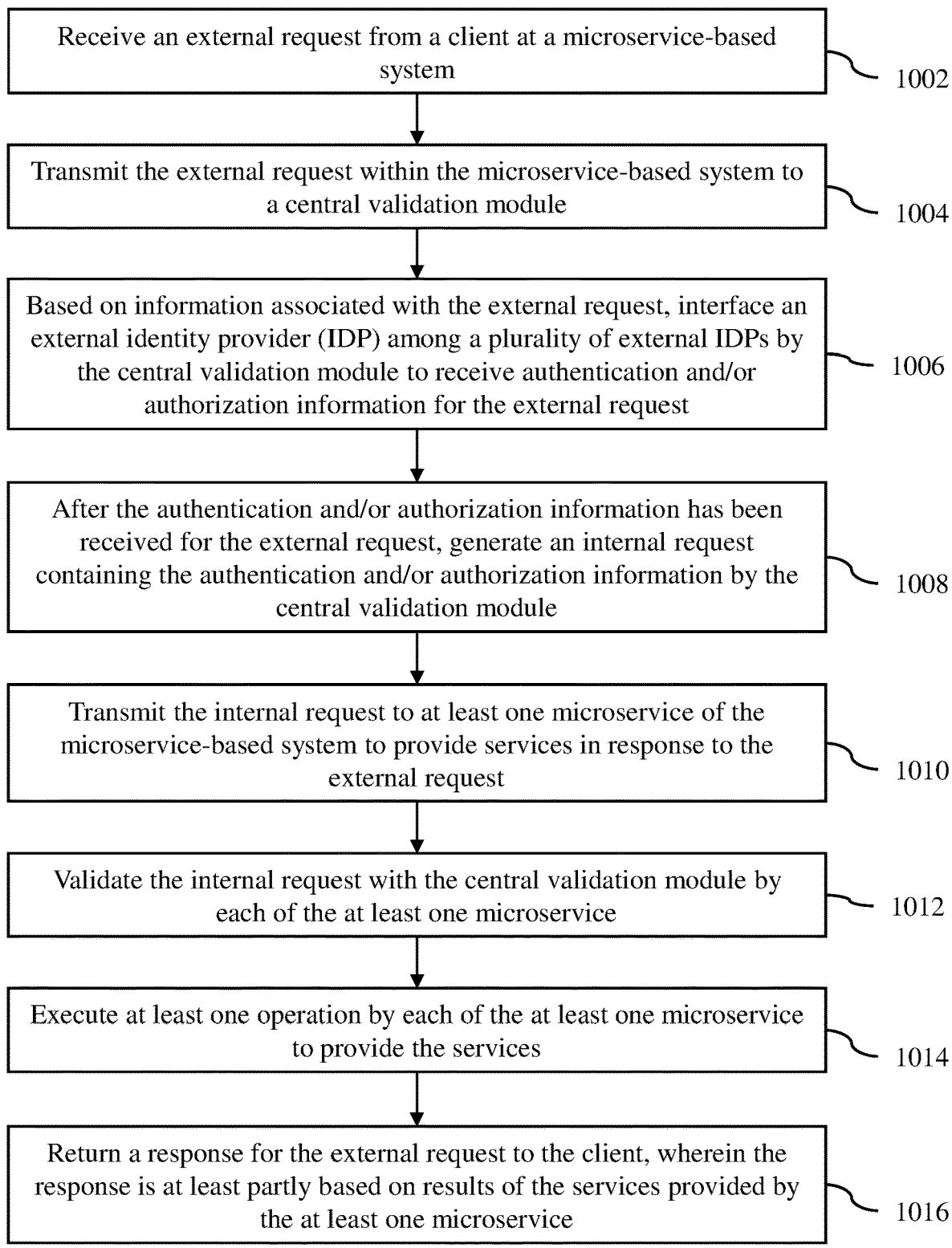
FIG. 10 is a process flow diagram of a method executed by one or more processors in accordance with an embodiment of the invention.

A method executed by one or more processors in accordance with an embodiment of the invention is now described with reference to a flow diagram of FIG. 10. At block 1002, an external request from a client is received at a microservice-based system. At block 1004, the external request is transmitted within the microservice-based system to a central validation module. At block 1006, based on information associated with the external request, an external identity provider (IDP) among a plurality of external IDPs is interfaced by the central validation module to receive authentication and/or authorization information for the external request. At block 1008, after the authentication and/or authorization information has been received for the external request, an internal request containing the authentication and/or authorization information is generated by the central validation module. At block 1010, the internal request is transmitted to at least one microservice of the microservice-based system to provide services in response to the external request. At block 1012, the internal request is validated with the central validation module by each of the at least one microservice. At block 1014, at least one operation is executed by each of the at least one microservice to provide the services. At block 1016, a response for the external request is returned to the client, wherein the response is at least partly based on results of the services provided by the at least one microservice.

Methods and apparatus for centralized authentication and/or authorization for a microservice-based system have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

Similarly, reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:
   receiving an external request from a client at a microservice-based system;
   transmitting the external request within the microservice-based system to a central validation module;
   based on information associated with the external request, interfacing an external identity provider (IDP) among a plurality of external IDPs by the central validation module to receive authentication and/or authorization information for the external request;
   after the authentication and/or authorization information has been received for the external request, generating an internal request containing the authentication and/or authorization information by the central validation module;
   transmitting the internal request to at least one microservice of the microservice-based system to provide services in response to the external request;
   validating the internal request with the central validation module by each of the at least one microservice;
   executing at least one operation by each of the at least one microservice to provide the services; and
   returning a response for the external request to the client, wherein the response is at least partly based on results of the services provided by the at least one microservice.

2. The method of claim 1, wherein at least one of the external and internal requests includes a token.

3. The method of claim 2, wherein the token is a JavaScript Object Notation (JSON) Web Token.

4. The method of claim 2, further comprising transmitting the token from a first microservice in the microservice-based system to a second microservice in the microservice-based system so that the token can be used by the first microservice and the second microservice with the central validation module for authentication and/or authorization validation.

5. The method of claim 2, further comprising forwarding the token to a microservice in the microservice-based system based on an identification of the client.

6. The method of claim 5, wherein the identification of the client is based on a uniform resource locator (URL) associated with the external request that identifies the client.

7. The method of claim 1, further comprising executing authentication and/or authorization internally at the microservice-based system by the central validation module for requests from particular clients.

8. The method of claim 1, wherein the microservice-based system is a storage interface system that manages storage resources of a storage system for one or more virtualization environments.

9. A non-transitory computer-readable storage medium containing program instructions, wherein execution of the program instructions by one or more processors of a computer causes the one or more processors to perform steps comprising:
   receiving an external request from a client at a microservice-based system;
   transmitting the external request within the microservice-based system to a central validation module;
   based on information associated with the external request, interfacing an external identity provider (IDP) among a plurality of external IDPs by the central validation module to receive authentication and/or authorization information for the external request;
   after the authentication and/or authorization information has been received for the external request, generating an internal request containing the authentication and/or authorization information by the central validation module;
   transmitting the internal request to at least one microservice of the microservice-based system to provide services in response to the external request;
   validating the internal request with the central validation module by each of the at least one microservice;
   executing at least one operation by each of the at least one microservice to provide the services; and
   returning a response for the external request to the client, wherein the response is at least partly based on results of the services provided by the at least one microservice.

10. The non-transitory computer-readable storage medium of claim 9, wherein at least one of the external and internal requests includes a token.

11. The non-transitory computer-readable storage medium of claim 10, wherein the token is a JavaScript Object Notation (JSON) Web Token.

12. The non-transitory computer-readable storage medium of claim 10, wherein the steps further comprise transmitting the token from a first microservice in the microservice-based system to a second microservice in the microservice-based system so that the token can be used by the first microservice and the second microservice with the central validation module for authentication and/or authorization validation.

13. The non-transitory computer-readable storage medium of claim 10, wherein the steps further comprise forwarding the token to a microservice in the microservice-based system based on an identification of the client.

14. The non-transitory computer-readable storage medium of claim 13, wherein the identification of the client is based on a uniform resource locator (URL) associated with the external request that identifies the client.

15. The non-transitory computer-readable storage medium of claim 9, wherein the steps further comprise executing authentication and/or authorization internally at the microservice-based system by the central validation module for requests from particular clients.

16. The non-transitory computer-readable storage medium of claim 9, wherein the microservice-based system is a storage interface system that manages storage resources of a storage system for one or more virtualization environments.

17. A system comprising:
   memory; and
   at least one processor configured to:
      receive an external request from a client at a microservice-based system;
      transmit the external request within the microservice-based system to a central validation module;
      based on information associated with the external request, interface an external identity provider (IDP) among a plurality of external IDPs by the central validation module to receive authentication and/or authorization information for the external request;
      after the authentication and/or authorization information has been received for the external request, generate an internal request containing the authentication and/or authorization information by the central validation module;
      transmit the internal request to at least one microservice of the microservice-based system to provide services in response to the external request;
      validate the internal request with the central validation module by each of the at least one microservice;
      execute at least one operation by each of the at least one microservice to provide the services; and
      return a response for the external request to the client, wherein the response is at least partly based on results of the services provided by the at least one microservice.

18. The system of claim 17, wherein at least one of the external and internal requests includes a token.

19. The system of claim 18, wherein the token is a JavaScript Object Notation (JSON) Web Token.

20. The system of claim 18, wherein the at least one processor is configured to transmit the token from a first microservice in the microservice-based system to a second microservice in the microservice-based system so that the token can be used by the first microservice and the second microservice with the central validation module for authentication and/or authorization validation.

* * * * *